United States Patent
Lawrence

(10) Patent No.: US 7,055,791 B2
(45) Date of Patent: Jun. 6, 2006

(54) COUNTER-BALANCING MECHANISM

(75) Inventor: Jeffrey Lawrence, Hertfordshire (GB)

(73) Assignee: Ronford-Baker Engineering Company Ltd., Watford (GB)

( * ) Notice: Subject to any disclaimer, the term of this patent is extended or adjusted under 35 U.S.C. 154(b) by 0 days.

(21) Appl. No.: 10/467,686

(22) PCT Filed: Feb. 8, 2002

(86) PCT No.: PCT/GB02/00529

§ 371 (c)(1),
(2), (4) Date: Aug. 8, 2003

(87) PCT Pub. No.: WO02/065013

PCT Pub. Date: Aug. 22, 2002

(65) Prior Publication Data

US 2004/0051024 A1    Mar. 18, 2004

(30) Foreign Application Priority Data

Feb. 9, 2001    (GB) .................................. 0103180.6

(51) Int. Cl.
*F16M 13/00*    (2006.01)

(52) U.S. Cl. ................. 248/578; 248/292.11; 248/364; 352/243

(58) Field of Classification Search ........... 248/292.11, 248/578, 364, 297.11, 280.11, 185.1, 648, 248/183.1, 178.1; 352/243
See application file for complete search history.

(56) References Cited

U.S. PATENT DOCUMENTS 4,083,524 A * 4/1978 O'Connor ................. 248/183.3
4,113,215 A * 9/1978 Stapleton ................. 248/183.3
4,771,979 A   9/1988 Nakazawa et al.
4,959,671 A * 9/1990 Ishikawa .................... 396/428
4,989,814 A * 2/1991 Uehara et al. ........... 248/183.3
5,419,520 A * 5/1995 Ishikawa ................. 248/183.2
5,553,821 A * 9/1996 Ishikawa ............... 248/292.11

FOREIGN PATENT DOCUMENTS

EP      0 696 702 A1    2/1996

OTHER PUBLICATIONS

International Search Report of PCT/GB02/00529, dated May 2, 2002.
International Preliminary Examination Report of PCT/GB02/00529, dated May 9, 2003.

* cited by examiner

*Primary Examiner*—Kimberly Wood
(74) *Attorney, Agent, or Firm*—Christie, Parker & Hale, LLP

(57) ABSTRACT

A counter-balancing mechanism is provided that includes a support for supporting an article to be tilted about a horizontal axis, and an annular cam movable with the support, wherein the cam has a cam surface which varies in height in a direction normal to the plane of rotation of the support. A cam follower is loaded by a resilient member, whereby, as the support rotates, the cam follower and resilient member cause a return force to be exerted on the cam surface to substantially counteract the torque caused by the rotation of the support. A reaction member for varying the return force in accordance with a load on the support is provided, wherein the cam is able to rotate about its own axis which is offset from the axis of rotation of the support, and wherein the reaction member includes a variable reaction point, against which the cam follower force reacts, at or offset from the axis of rotation of the support, thereby to cause the return force exerted due to rotation of the support about a particular angle to be varied.

17 Claims, 3 Drawing Sheets

Energy Pack

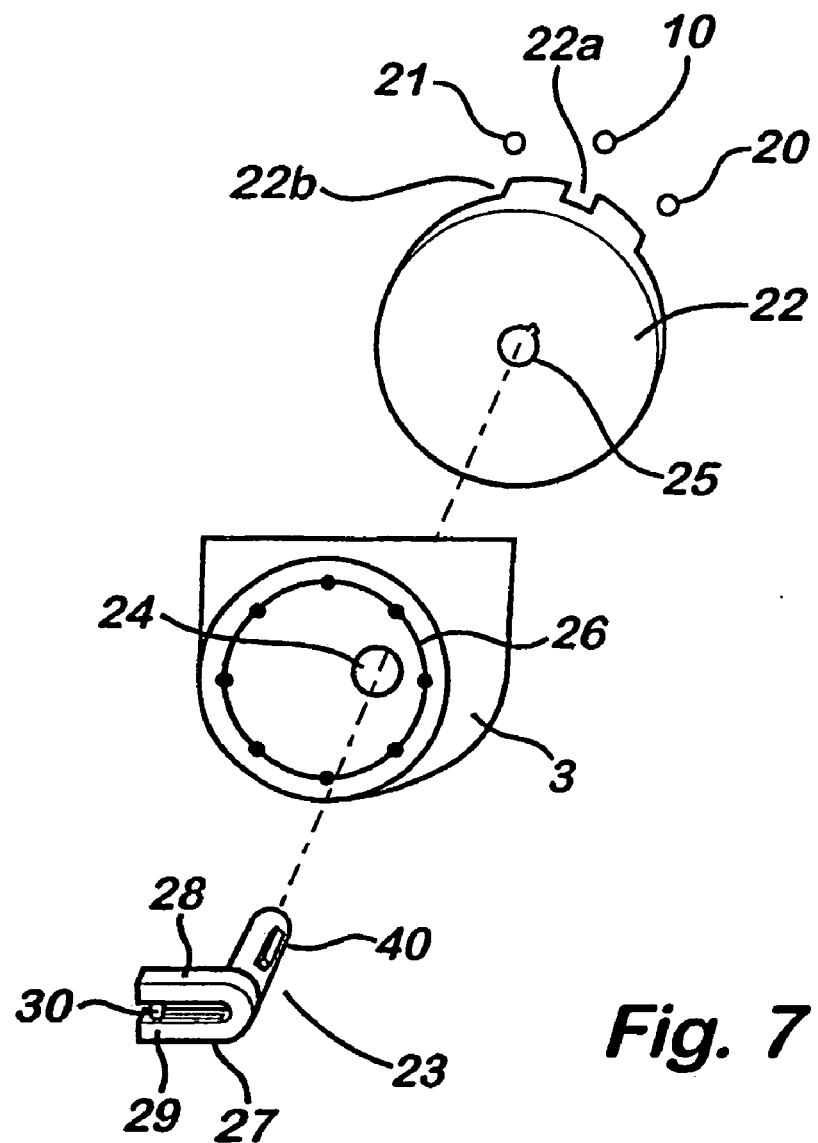
Fig. 7
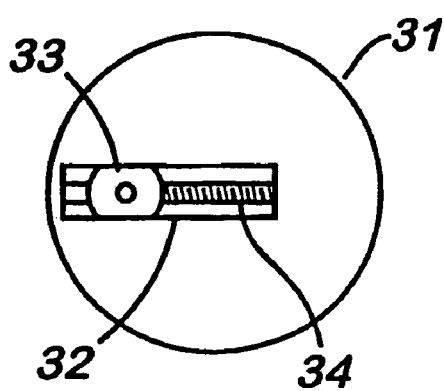

COUNTER-BALANCING MECHANISM

CROSS-REFERENCE TO RELATED APPLICATION

This application is a National Phase Patent Application of International Application Number PCT/GB02/00529, filed on Feb. 8, 2002, which claims priority of British Patent Application Number 0103180.6, filed on Feb. 9, 2001.

FIELD OF THE INVENTION

This invention relates to a counter-balancing mechanism. In particular, but not exclusively, it relates to a counter-balancing mechanism forming part of a pan/tilt head, such as a fluid head, for mounting on a tripod and supporting a camera or other equipment which can be tilted about a horizontal axis.

BACKGROUND OF THE INVENTION

There is often a requirement for camera equipment to be tilted about a horizontal axis using a head which can hold the equipment balanced at any desired angle about the horizontal axis. Whilst a manual mechanism can be used, in which the camera is set at the desired angle and then the head is clamped at that angle, this is unsatisfactory and cumbersome and is not very useful for professional purposes.

Many counter-balancing mechanisms have been proposed in the past but up to now it has been found very difficult to obtain a counter-balancing mechanism which effectively counter-balances a load (which can be fairly substantial, up to around 50 kilograms for a camera for example) at virtually any desire angle. Referring to FIG. 1, if a camera of load L is rotated about a horizontal axis A through a desired angle then the torque at any angle is equal to the load L times the horizontal distance L of the load from the axis and this increases generally sinusoidally as the angle from the vertical increases. The counter-balancing mechanism is required to counteract this and, since it is not a linear function, this is difficult to achieve within a package of acceptable size/mass.

Furthermore, allowance must also be made first for variations in the weight of an item to be placed upon the support and tilted, and secondly for variations in the position of the centre of gravity of an item (for example, a camera mounted on a tripod may have its centre of gravity which is not coincident with the point which will be mounted directly above the centre of the tripod).

The present invention arose in an attempt to provide an improved counter-balancing mechanism.

SUMMARY OF THE INVENTION

According to the present invention in a first aspect there is provided a counter-balancing mechanism comprising a support for supporting an article to be tilted about a horizontal axis; a cam movable with the support, the cam surface of which varies in a direction normal to the plane of rotation of the support; and a cam follower loaded by a resilient means whereby, as the support rotates, the cam follower and resilient means causes a return force to be exerted to substantially counteract the torque caused by the rotation of the support.

The resilient means is preferably on or more springs.

Preferably, a means for varying the return force in accordance with a load on the support is provided, wherein the cam and resilient means is able to rotate about a centre offset from the central axis about which the support rotates and including means for setting a variable reaction point, against which the cam follower force reacts, at or offset from said central axis, thereby to cause the return force exerted due to rotation of the support about a particular angle to be varied.

According to the present invention there is further provided a counterbalancing mechanism or a tilt head comprising any one or more of the novel features herein described.

BRIEF DESCRIPTION OF THE DRAWINGS

Embodiments of the invention will now be described, by way of example only, with reference to the accompanying drawings, in which:

FIG. 7 shows an exploded view of part of an embodiment of the invention.

DETAILED DESCRIPTION OF THE DRAWINGS

Figure 1A:
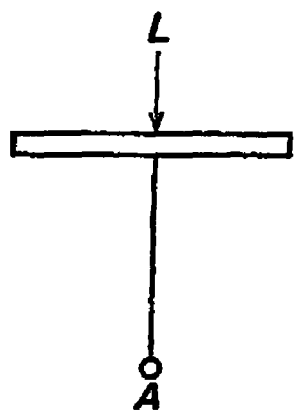
FIG. 1a and FIG 1b show a load pivoting about a pivot point.
Figure 1B:
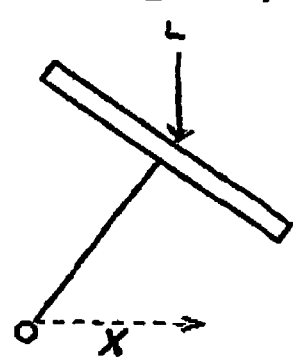

As described above, with reference to FIGS. 1a and 1b, as a load on a platform is tilted about an axis, the load introduces a varying torque. The invention arose in an attempt to provide a mechanism for a tiltable platform, such as tilt/pan head for camera or other audio-visual equipment, which can counter-balance this effect at any desired tilt angle.

Figure 2:
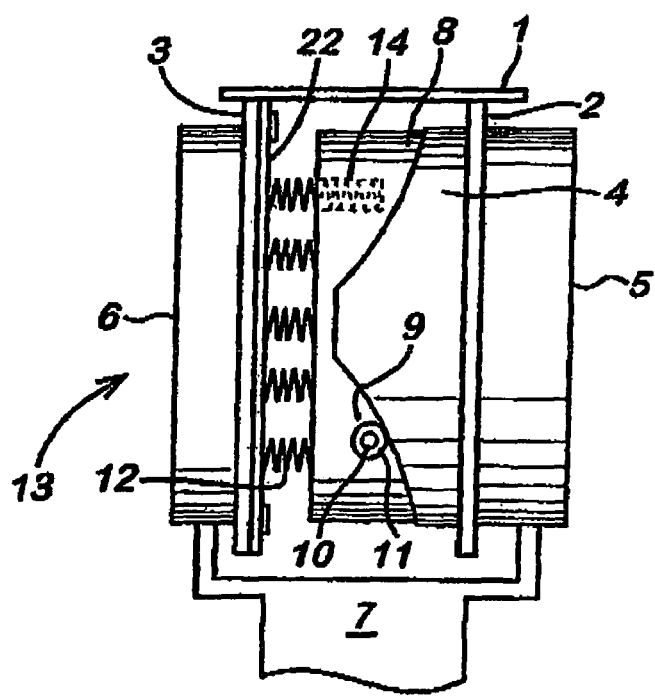
FIG. 2 shows schematically a side view of part of a support apparatus.
Figure 3:
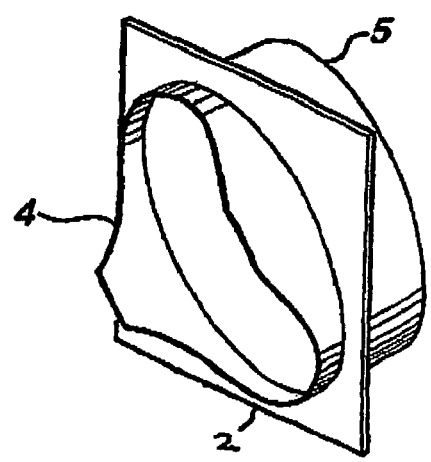
FIG. 3 shows a partial perspective view of the apparatus.

Referring to FIG. 2, a tilt/pan head comprises a platform 1 upon which apparatus to be supported, such as a camera, is mountable. The platform 1 is mounted upon two spaced rectangular plates 2, 3. Plate 3 is shown in more detail in FIG. 7, plate 2 is similar. Plate 2 is provided with a cam 4 which extends from one face towards the other plate forming a generally annular axial projection as shown in FIGS. 2 and 3. The cam may be integral with the plate or affixed to it. The height of the cam varies radially around the cam. Plate 2 is mounted so that it can rotate about a horizontal axis relative to a fluid filed generally cylindrical body 5. Relative rotation occurs about bearings between these, which bearings are not shown for clarity. Similarly, plate 3 rotates relative to a cylindrical body 6 and a hub 22 and again bearings are provided. Bodies 5 and 6 are connected to a common structure 7 which is mounted to, or indeed could form part of, a tripod or other stable structure upon which the head can be mounted. Where the head is a tilt and pan head, the structure 7 may be arranged to rotate about a vertical axis so that rotation in both the horizontal and vertical plane is achieved. This range or rotation is usually desirable.

A further cylindrical body (or drum) 8 is sized so that it can sit within the annular region defined by the cam 4 and has, on it lateral surface, a cam follower 9. This generally comprises a stud, pin or projection 10 extending from the outer surface of body 8 and an annular ring coaxial with the pin and adapted to freely rotate relative thereto 11, the ring being able to slide relative to the top surface of the cam 4.

Body 8 is generally solid apart from being provided with a plurality of bore holes 14 which open at the surface of the body nearest to hub 22. A plurality of springs 12 are mounted, one in each of the bore holes and these are mounted, or simply supported, at their other end by the hub 22. The plate 3 rotates relative to this. Other types of resilient means may be provided but preferably these are springs which are preferably pre-stressed. In one non-limiting embodiment, twenty springs are provided, the rating of each spring being about 9.72 N/mm.

The bores in member 8 are simply to provide locations for the springs and the springs may instead simply be mounted against one end of the cylindrical body 8.

Figure 5:
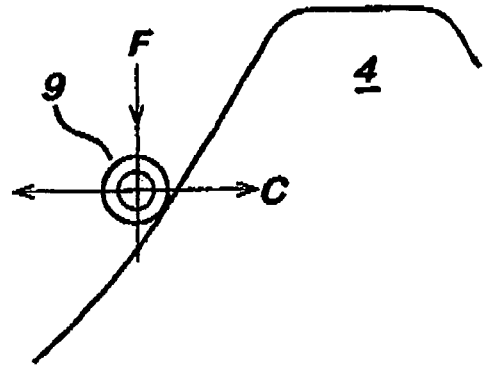
FIG. 5 shows a cam profile and follower.

In use, the head assembly 13 is based upon a tripod or other stable structure and a camera or other apparatus to be tilted is affixed to platform 1 by a suitable means. When the apparatus is tilted, the cam 4 also rotates. The cam follower is pushed by the springs 12 against the cam and thus the cam follower is moved with a longitudinal component of motion by the action of the cam. This causes the springs 12 to be compressed to a further or lesser extent and the hub 22 produces an equal and opposite return force on body 8 and therefore causes the cam follower 9 to exert a greater or lesser returning force against the cam 4. As is shown schematically in FIG. 5, a return force F in a direction which is not normal to a cam surface also causes a force having a component at 90° to the force F and which serves to resist movement of the cam. It is this resisting force, which varies as the return force on the spring varies as the cam is moved longitudinally backwards and forwards, which serves to counter-balance the varying torque of the load tilting.

Since the change in torque as the platform rotates is not linear, the shape of the cam has to take account of this non-linearity. The cam profile, in terms of height and degree of rotation has to take the following into account.

(a) The moment given by the load coming off-centre;

(b) Change in effective length of lever due to the load pivoting about the axis;

(c) Spring energy due to compression given by cam height; and (d) Gradient of the cam.

The spring energy depends upon the preload and additional compression given by the cam height. It may be noted that cam height and gradient are interactive. Preferably, the profile is calculated for each point on the cam to within, say, one tenth of a degree but may be provided in other (eg larger) increments or by formula if produced on computer aided machinery and this can be done by those skilled in the art. In one example, for a particular load and assuming that the axis of the centre of gravity of the load coincides with the central axis of the tilting apparatus, one set of cam and cam rise angles varies with cam angle as follows:

TABLE 1

| cam rotation angle | cam height | cam gradient |
| --- | --- | --- |
| 0 | 0 | 0 |
| 5 | 0.302058 | 5.66776 |
| 10 | 1.151864 | 10.448357 |
| 15 | 2.441784 | 13.963848 |
| 20 | 4.047112 | 16.297206 |
| 25 | 5.857201 | 17.704133 |
| 30 | 7.785164 | 18.431862 |
| 35 | 9.766036 | 18.667698 |
| 40 | 11.75182 | 18.543012 |
| 45 | 13.70694 | 18.149181 |
| 50 | 15.6049 | 17.551556 |
| 55 | 17.42597 | 16.799146 |
| 60 | 19.15571 | 15.930768 |
| 65 | 20.7839 | 14.978767 |

TABLE 1-continued

| cam rotation angle | cam height | cam gradient |
| --- | --- | --- |
| 67.9 | 21.67896 | 14.39946 |
| 70 | 21.70921 | 14.39946 |

This assumes a payload of 40 Kg, load radius of 250 mm, use of 20 springs each rated as 9.72 N/mm having free length of 89.9 mm and minimum length of 44.27 mm.

The cam followers are, in one embodiment of the invention, constrained so that the cam rotates relative to them, in order for the followers to move around the cam.

Although one follower is shown in FIG. 2, a plurality of equi-spaced followers is highly desirable and will generally be used, in order to balance forces about the axis, in keeping with good practice.

Bodies 8 and 22 are required to be torsionally rigid with regard to each other, whilst allowing for relative axial movement. This can be achieved by many means such as keys, splines or similar. However, in order to avoid detrimental backlash or axial friction either chordal links or the method as follows may be used. In the present preferred embodiment, a further pair of projections 20, 21 (FIG. 4) are provided on cam follower body 8 and, in use, these impinge upon a peripheral axial projection 22b from hub 22 which may require a cut-out 22a to clear axial movement of cam follower 10. The elements 20 and 21 may be of similar construction to the cam follower, having a projection from body 8 and a rotatable disk so that they, and therefore body 8, can slide longitudinally relative to hub 22. If, as may be preferred for a balance of forces, more than one projection is provided, then an equivalent number of associated pairs of elements 20 and 21 (cam followers) may be provided, being equispaced.

The cam profile, and/or spring rate is chosen in the above described embodiment for a load of a particular weight and which is mounted with its centre of gravity in a particular position relative to the support mechanism so as to provide equal and opposite return forces to counterbalance tilt of the load. In practice, it is desirable to be able to accommodate loads of different weights or of variable centres of gravity, which may well not overlie the centre of the apparatus. Accordingly, in preferred embodiments of the invention, a mechanism is included to provide for this adjustability.

Figure 4:
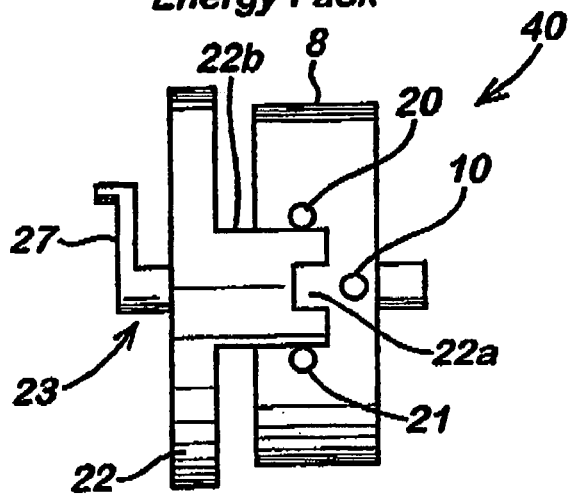
FIG. 4 shows a side view of part of the apparatus.

FIG. 4 shows parts of the apparatus which may be termed an 'energy pack' 40. This comprised drum 8, with followers 10, 20, 21, hub 22 and a lever 27 with shaft 23 that extends through plates 22, 26 and into plate 2. Thus the 'energy pack' can rotate about an axis which is offset from the axis of rotation O of the platform. Hub 22 (and therefore the cam followers and springs) rotates with shaft 23, as shaft 23 has a key 20 (FIG. 7), which fits into a keyway 25 in the central hole in hub 22. The cam is also mounted offset from the centre of plate 2 and so the axis of rotation of the cam and resilient means is offset from the axis of rotation of the support (being coaxial with bearing 26).

Figure 6A:
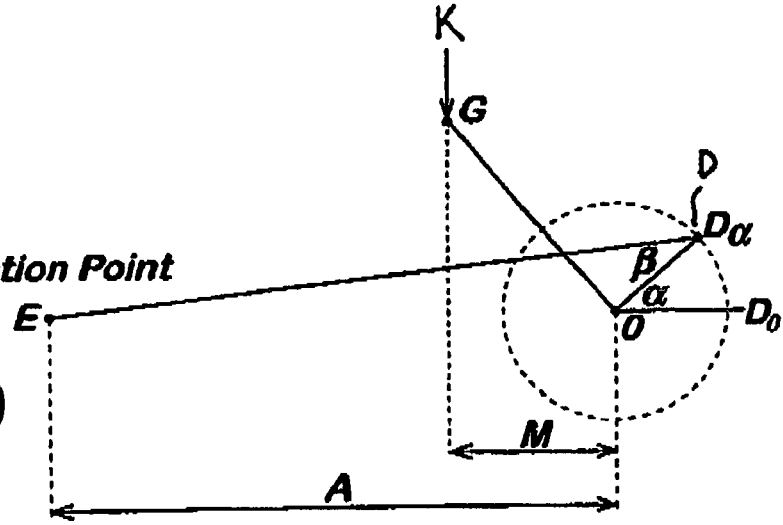
FIG. 6(a) and (b) shows the affect of rotating the cam follower about an axis which is off-set from the axis of rotation of the platform.
Figure 6B:
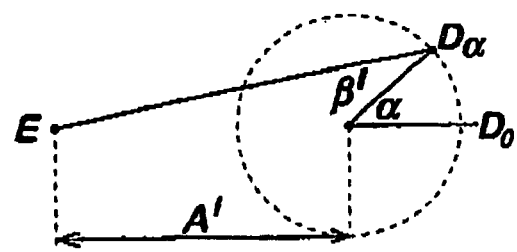

FIGS. 6(a) and 6(b) illustrate the effect of this. In FIG. 6(a) point O is the centre of tilt rotation, D is the centre of the energy pack and E is the reaction point for the energy pack. A mechanism for achieving this is described further below. The load of mass K and is positioned such that its centre of gravity acts at point G which is spaced a distance M, given by and commensurate with α, from the centre of tilt rotation O.

As the load is tilted by an angle α then the cam followers are rotated around the cam by angle β°, due to being constrained by reaction point E. The cam/spring configuration is designed to provide a reaction equal and opposite to the load torque KM for any angle of α between plus or minus 90°. As described, this can be precisely calculated if the load and the radius OG is constant. To accommodate changes in the load K or the radius OG (and therefore M) the distance A may be adjusted. That is, the position of the reaction point may be adjusted. For a reduced moment KM, A needs to be reduced and this reduces the rotation B of the followers around the can there by reducing the reaction. This is shown in FIG. 6(b) where point E has been moved such that it is a distance of A' from the centre of tilt rotation O.

As is seen from a comparison of FIG. 6(a) and FIG. 6(b) if distance A is reduced from a to A' then angle β also changes from β to β' for the same angle α. The practical effect of this is the cam followers are acted upon by a different part of the cam and therefore exert a different return force and therefore counterbalancing force for the same angle of tilt. Thus, a light load at a tilt of α° may use that part of the cam which will be used by a heavier load at a different angle α plus or minus Δα. For example, a light load at, say, 60° tilt may use that part of the cam which would be used by a heavier load at, say, 30°.

The cam calculation is required to account for variation in length ED as α changes, for a fixed distance A. As shown in FIG. 7, an adjustable reaction point E is achieved by providing a lever 23 which passes through a bearing 24 which is generally central within plate 3 (FIG. 2) and drives hub 22 via key 40 and keyway 25. Lever 23 extends through a plate 6 (FIG. 2) which is mounted with its centre off axis from the centre of plates 3 and 2 and able to rotate about bearing 26. The lever has a generally U-shaped portion 27 having two arms 28 and 29 which hold between them a moveable key 30 which is slidable within the gap between the arms. A rear member 31 fixed within plate 6 is provided with a slot or cutaway 32 in which a pin is mounted upon a threaded bolt 34 or similar to move relative to the bolt away from and towards the centre of body 31. This is preferably adjusted from the other side of the plate by a simple rotating know for example which can move, by a well-known mechanism, the pin relative to the bolt. In order to adjust the point against which the energy pack reacts, the pin 33 is moved to a suitable radial position and this moves the key 30 relative to the lever 23. This adjustment can be done on a trial and error basis with each different load or, more preferably, the device can be calibrated so that once the load is known, and/or the offset of the mass of the load from the centre is known, the position of E can be established.

The invention claimed is:

1. A counter-balancing mechanism comprising:
  a support for supporting an article to be tilted about a horizontal axis;
  an annular cam movable with the support and having a cam surface which varies in height in a direction normal to the plane of rotation of the support;
  a cam follower;
  resilient means which loads the cam follower, whereby, as the support rotates, the cam follower and resilient means cause a return force to be exerted on the cam surface to substantially counteract the torque caused by the rotation of the support; and
  reaction means for varying the return force in accordance with a load on the support, wherein the annular cam is able to rotate about its own axis which is offset from the axis of rotation of the support, wherein said reaction means comprises means for setting a variable reaction point, against which the cam follower force reacts, at or offset from the axis of rotation of the support, thereby to cause the return force exerted due to rotation of the support about a particular angle to be varied.

2. A counter-balancing mechanism as claimed in claim 1, comprising an energy pack adapted to rotate about an axis which is offset from the axis of rotation of the support, the energy pack comprising a drum having cam follower, a hub and a lever arranged to enable the energy pack to rotate about an axis offset from the axis of rotation of the support.

3. A counter-balancing mechanism as claimed in claim 1 or 2, wherein the annular cam is mounted offset so that the axis of rotation of the annular cam and resilient means is offset from the axis of rotation of the support.

4. A counter-balancing mechanism as claimed in claim 1, forming part of a pan/tilt head.

5. A counter-balancing mechanism as claimed in claim 1, wherein the resilient means is one or more springs.

6. A counter-balancing mechanism as claimed in claim 1, wherein the annular cam forms a generally annular projection from a body, the projection having variable height to provide the cam surface.

7. A counter-balancing mechanism as claimed in claim 6, wherein the support is mounted upon two spaced plates, one of which bears the annular cam.

8. A counter-balancing mechanism as claimed in claim 7, wherein cam follower is provided on a body which is resiliently mounted against a hub adapted for relative rotational movement with the other of said plates.

9. A counter-balancing mechanism as claimed in claim 8, wherein the body fits within a region defined by the annular cam, and wherein the cam follower protrudes outwardly from the body.

10. A counter-balancing mechanism as claimed in claim 1, wherein the cam profile is chosen to take the following into account:
  (a) a moment given by a load coming-off centre;
  (b) a change in effective length of lever due to a load pivoting about the axis;
  (c) a spring energy due to compression derived from cam height; and
  (d) a gradient of cam.

11. A counter-balancing mechanism as claimed in claim 1, wherein the cam follower is contoured so that the cam moves relative to the cam follower.

12. A counter-balancing mechanism as claimed in claim 1, comprising a plurality of equi-spaced followers.

13. A counter-balancing mechanism as claimed in claim 1, including means for compensation for variation in load or distance of the centre of gravity of the load from a pivot.

14. A counter-balancing mechanism as claimed in claim 13, comprising means for selecting a reaction point.

15. A counter-balancing mechanism as claimed in claim 14, wherein a lever forming part of an energy pack forms a keyway and a key is selectably located at a variable position within the keyway, to form a variable pivot reaction point.

16. A counter-balancing mechanism as claimed in claim 1, wherein the cam is annular and the cam follower protrudes outwardly from a body which is at least partially disposed within the annular cam.

17. A pan/tilt head, comprising a counter-balance mechanism as claimed in claim 1.

* * * * *